March 11, 1924.  J. M. VAN HEUSEN  1,486,701
COLLAR
Filed Jan. 25, 1922   5 Sheets-Sheet 1

INVENTOR
John M. van Heusen
BY
Pennie Davis Marvin Edmonds
ATTORNEYS

March 11, 1924.

J. M. VAN HEUSEN

COLLAR

Filed Jan. 25, 1922   5 Sheets-Sheet 2

INVENTOR
BY John M. van Heusen
Pennie Davis Marvin & Edmonds
ATTORNEYS

March 11, 1924.

J. M. VAN HEUSEN

COLLAR

Filed Jan. 25, 1922  5 Sheets-Sheet 3

1,486,701

INVENTOR
John M. van Heusen
BY
Pennie Davis Marvin & Edmonds
ATTORNEYS

March 11, 1924.

J. M. VAN HEUSEN

COLLAR

Filed Jan. 25, 1922    5 Sheets-Sheet 4

1,486,701

INVENTOR
BY John M van Heusen
Pennie Davis Marvin Edmonds
ATTORNEYS

March 11, 1924.

J. M. VAN HEUSEN

COLLAR

Filed Jan. 25, 1922   5 Sheets-Sheet 5

INVENTOR
John M van Heusen
BY Pennie Davis Marvin Edmonds
ATTORNEYS

Patented Mar. 11, 1924.

1,486,701

UNITED STATES PATENT OFFICE.

JOHN MANNING VAN HEUSEN, OF JAMAICA PLAIN, MASSACHUSETTS, ASSIGNOR TO VAN HEUSEN PRODUCTS, INC., A CORPORATION OF DELAWARE.

COLLAR.

Application filed January 25, 1922. Serial No. 531,757.

*To all whom it may concern:*

Be it known that I, JOHN MANNING VAN HEUSEN, a citizen of the United States, residing at 33 Lakeville Place, Jamaica Plain, in the county of Suffolk, State of Massachusetts, have invented certain new and useful Improvements in Collars; and I do hereby declare the following to be a full, clear, and exact description of the invention, such as will enable others skilled in the art to which it appertains to make and use the same.

This invention relates to improvements in folding or turning down collars adapted to be worn without starching, and more particularly to collars made up of a single piece of heavy fabric, such as multiple ply interwoven fabric.

According to the present invention, instead of weaving the collar fabric of a uniform weave, with the neck band and folding portion of the collar having the same appearance and being of the same weave, I weave the neck band portion and folding portions, respectively, of distinctive weaves or weaves having different or distinctive appearances.

The invention further includes an improved construction of one piece collars in which the neck band and folding portions may or may not be woven with weaves of distinctive appearance, but in which either the neck band portion or the folding portion or both are woven with an irregular weave, for example, with stiffening longitudinal or transverse ribs woven integrally therewith, or with designs woven in the collar so that the collar will be distinguished and differentiated from a collar of uniform appearance.

Reference may be had to my co-pending application, Serial No. 570,909, filed June 26, 1922, in which I disclose and specifically claim collars of the built-up type made either wholly or in part of fabrics of the nature disclosed in this case. It will be understood that by built-up collars I mean collars made of two or more pieces of material which are cut separately to the proper shape and subsequently stitched together.

The collars of the present invention, accordingly, may, from one standpoint, be considered to depart from the principle of collar manufacture in which the collar fabric is of uniform weave, or of a weave presenting a uniform appearance; and the invention provides a collar of multiple ply interwoven fabric in which a modified weave (as distinguished from a uniform weave) is utilized.

In the weaving of multiple ply interwoven fabric, the weaving operation for the production of a uniform weave involves the interweaving of threads from one ply to another to secure the separate plies or the different portions of the fabric into an integral interwoven whole. The interweaving operation is a regularly recurring operation and the interweave threads, while they may give to the fabric a distinctive appearance, as compared with a uniformly woven single ply fabric, nevertheless itself presents a uniform appearance. According to the present invention, however, I modify such uniform interweaving operation, and carry out the interweaving operation in such a way that the resulting collar fabric, and the collars made therefrom, will have the inherent differences in construction and appearance (different from that where the weaving is uniform) resulting from the modification of the normal uniform interweaving.

According to one embodiment of the invention, I weave the fabric as a composite fabric with the neck band having a uniform weave and the folding or turn down portion with a modified and distinctive weave. According to another embodiment of the invention I modify the weave of the neck band and leave the folding portion of uniform weave. According to still other embodiments of the invention, both the neck band and the folding portions may be made of the modified or irregular weave. For example, the neck band of the collar may be woven with transverse ribs which terminate at the upper edge of the neck band and which are so woven and arranged that the ends of the ribs will form a natural fold line at which the collar will naturally fold. Such transverse ribs will further tend to stiffen and reinforce the neck band. Where similar transverse ribs are woven in the folding portion, they will similarly stiffen and reinforce the folding portion of the collar, and supplement the inherent stiffness of the multiply fabric itself by the added stiffness of the reinforcing ribs or bars. If both the neck band and folding portions are woven with such reinforcing ribs or bars, they will both be stiffened and reinforced in the manner indicated. By providing the transverse ribs or bars on the outside of the folding or turn down portion, the collar will have a different appearance from that of a collar of uniform weave, and this distinctive appearance will be an added feature, in addition to the advantage of increased stiffness which the ribs may provide. If the reinforcing ribs are on the inside of the folding portion, the outside of the folding portion may still present the appearance of a uniform weave, while it will still be reinforced by the reinforcing ribs or bars.

Instead of providing transverse ribs or bars in the multiple fabric, the fabric may be woven with longitudinal ribs or bars which will stiffen and reinforce the fabric longitudinally, and the collar circumferentially. If such ribs or bars are on the outside of the collar, they will give it a ribbed or barred appearance. If on the inside of the folding or turn down portion or on the neck band, they will similarly stiffen the collar, but the collar may nevertheless present the appearance on the outside of a uniform weave. That is, the multiple ply interwoven fabric may have its outer ply, at the neck band portion, of a uniform weave, and may have its inner ply or plies of the modified weave. In other words, the collar fabric may be a composite fabric made up in part of uniform weave fabric or plies and irregular weave fabric or plies. Where the fabric is woven with longitudinal ribs or bars, these may, if of appropriate size and arrangement, provide portions between them at which the collar fabric will more readily fold. The fabric between two such ribs or bars may thus be arranged to form the fold line of the collar.

The collar fabric may, in some cases, be woven as a straight fabric and of a width several times that of the width of a single collar; or it may be woven as a narrow fabric of a width corresponding or somewhat greater than the width of a single collar. In weaving a narrow fabric, the fabric can be woven with a curvilinear weave and with a curvilinear line of union between the portions of the fabric which are to form the neck band and folding portions respectively. In weaving such fabrics, designs of various kinds may be woven on the portion of the fabric which is to form the fold portion, while leaving the neck band of uniform weave. Collar designs, for example, can thus be woven in the fabric, or the entire fabric, including the neck band portion, may be woven with such designs, or with a special and distinctive weave.

The fabric of which the collars of the present invention are made may, for example, be a two-ply fabric or a three-ply fabric, or a two-ply fabric with intermediate filling threads interwoven therewith. In some cases, however, the fabric may not perhaps be properly referred to as a two-ply fabric or as a three-ply fabric, for the reason that the modification of the weave makes the fabric depart from what would commonly be accepted as two-ply or three-ply fabrics, particularly when such fabrics are woven with a uniform weave. In referring to the modified weave fabric as a multiple ply fabric, accordingly, I intend to include such modified weaves which depart from the ordinary weaves of multiple ply interwoven fabric.

The invention will be further described in connection with the accompanying drawings illustrating various embodiments of the invention, but it is intended and will be understood that these embodiments are intended in an illustrative and not in a limiting sense, and that variations and modifications can be made therein without departing from the spirit and scope of the invention, inasmuch as I believe it to be broadly new, in the art of manufacture of one piece collars of multiple ply interwoven fabric, to weave the fabric with a special and distinctive weave, departing from the common uniform weave of such fabrics.

The invention will be further described in connection with certain embodiments thereof which are illustrated in the accompanying drawings, in which.

Figures 1, 2, 4:
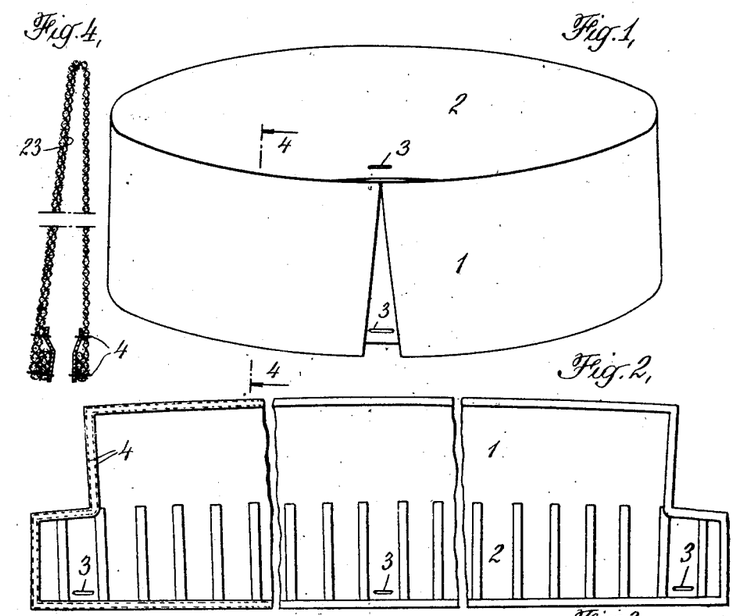
Fig. 1 is a perspective view of a completed collar.
Fig. 2 is a plan view of the collar of Fig. 1 unfolded.
Fig. 4 is an enlarged sectional view taken on the line 4—4 of Fig. 1.

Figs. 1 to 10 illustrate collars made up of one piece of multiple ply interwoven fabric having interwoven therewith on one or both sides of the fabric a series of transverse ribs. In these figures 1 is the outer or folding portion and 2 is the neckband portion, the neckband portion being provided with the customary buttonholes 3.

Figure 5:
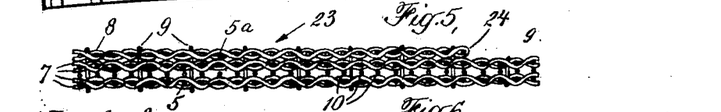
Fig. 5 is an enlarged sectional view showing conventionally one weave of the fabric, said view being taken on the line 5—5 of Fig. 3.
Figure 6:
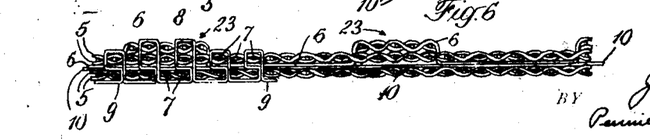
Fig. 6 is an enlarged sectional view showing conventionally another weave of the fabric, said view being taken on line 6—6 of Fig. 3.

Figs. 4, 5 and 6 show one suitable weave by which the fabric may be made. In this fabric two sets of warp threads 5 are interwoven with weft threads 7 to form two separate plies of fabric, these plies being separated by an intermediate warp filling thread layer 10 and the layers of fabric being integrally bound together by the interweave threads 9. The rib 23 is comprised of a layer of warp threads 6 interwoven with weft threads 8 and integrally bound to the main portion of the fabric by the interweave threads 9. It will be noted that at the middle of the fabric the ribs stop, a selvedge edge 24 being provided at the end of each rib. As shown in Fig. 6, the warp threads 6 of the ribs 23 pass between the layers or plies of the fabric, that is, alongside of the filling thread layer, at the points where the ribs are not woven in the fabric. The warp threads 6 pass through the upper layer or ply of the fabric and interweave with the weft threads 8 at the points where the ribs 23 are woven.

This fabric described above may advantageously be woven with a curvilinear weave, that is, the fabric may be woven in the arc of a circle, this result being obtained by means of conical take-up rolls on the loom, as described, for example, in U. S. Patent No. 1,254,340 of John L. Morgan. The ends or terminations of the ribs 23, as shown in Fig. 3, provide, when taken together, a generally curvilinear line, along which the collar will naturally fold.

Figure 3:
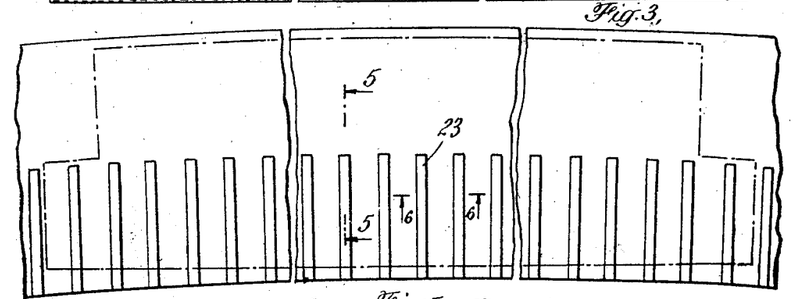
Fig. 3 is a plan view of a strip of curvilinear fabric from which the collar blank may be cut.

The collar of Figs. 1, 2 and 4 may be cut from the fabric of Fig. 3. It will be noted that the transverse ribs are positioned on the neckband portion of the collar so that when the collar is folded the ribs can be covered up or concealed by the turn-down or folding portion. These ribs will, nevertheless, serve to stiffen the neckband portion of the collar, and also to provide a natural curvilinear fold line for the collar. The edges of the collar may be turned, overlaid with a narrow strip of tape and secured by two rows of stitches 4, as shown in Figs. 2 and 4.

Figure 7:
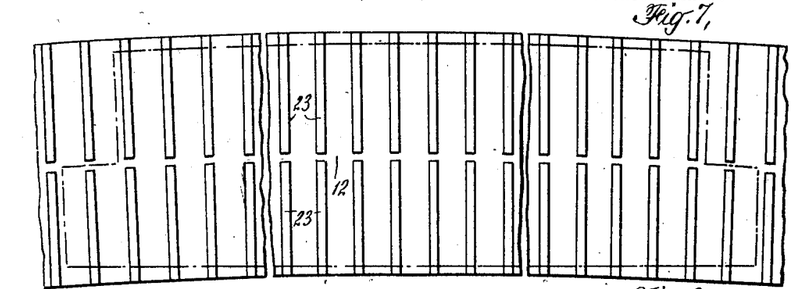
Fig. 7 is a plan view of a strip of fabric showing a modification of the fabric of Fig. 3.

Fig. 7 shows a modification of the fabric of Fig. 3. The transverse ribs in the fabric of Fig. 7 are woven completely across the fabric, a narrow break 12 being left in the said ribs along the central portion of the fabric. A collar made from a fabric of this kind, having the ribs woven entirely across the fabric as above described, is provided with additional stiffness both on the folding portion and on the neckband portion of the collar, and also a natural fold line of increased flexibility is provided along the curvilinear line resulting from the break or omission of a narrow strip of each rib.

Figure 8:
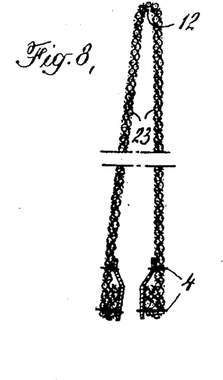
Fig. 8 is an enlarged sectional view of a collar made of the fabric of Fig. 7.

Fig. 8 is a sectional view of a collar made up of the fabric of Fig. 7, showing the ribs 23 on both the folding portion and the neckband portion of the collar, with the ribs on the inside of the collar when folded so as not to be exposed to view.

Figure 9:
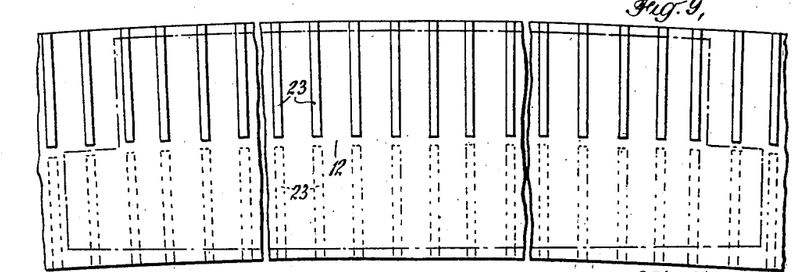
Fig. 9 is a further modification of the fabric of Fig. 3.

Fig. 9 shows a further modification of the fabric of Fig. 3. In this case the transverse ribs are woven on one face of the fabric up to the central portion of the said fabric, and another series of ribs is woven on the other face of the fabric on the opposite side of the central portion.

Figure 10:
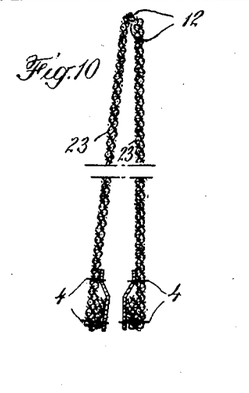
Fig. 10 is an enlarged sectional view of a collar made of the fabric of Fig. 9.

Fig. 10 is a sectional view of a collar made up of the fabric of Fig. 9 showing the ribs 23 on the outside of the folding portion and also on the outside of the neckband portion. The folding portion of this collar is provided with a weave of distinctive appearance, which has the further advantage of stiffening this portion of the collar.

Figure 11:
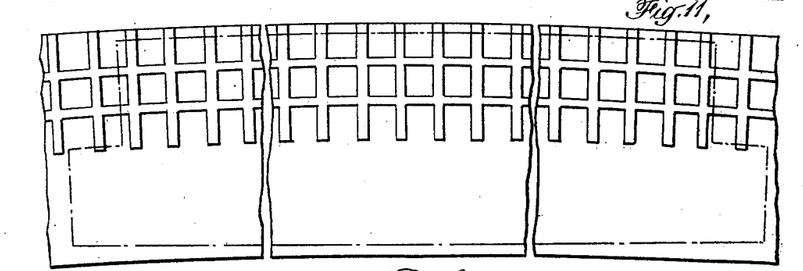
Fig. 11 is a still further modification of the fabric of Fig. 3.

The fabric of Fig. 11 is a still further modification of the fabric of Fig. 3, one side of the said fabric being provided with both transverse and longitudinal ribs, a collar made from fabric of this kind will be provided on its folding portion, where exposed to view, with a weave of pleasing and distinctive appearance.

Figure 15:
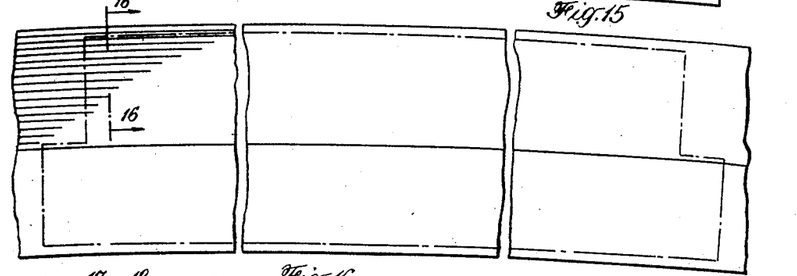
Fig. 15 is a plan view of a strip of fabric from which the collar blanks may be cut.
Figure 16:
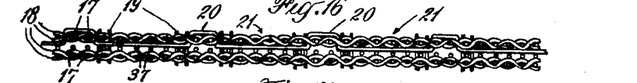
Fig. 16 is an enlarged sectional view showing conventionally one weave of the fabric of Fig. 15, taken on the line 16—16 of Fig. 15.
Figure 17:
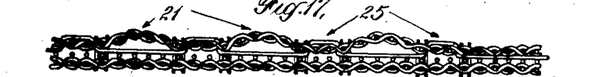
Fig. 17 is an enlarged sectional view showing conventionally one weave of the fabric of Fig. 15.

Figs. 12 to 22 inclusive show collars made up of a fabric having woven therein longitudinal ribs, the said ribs being either on one or both sides of the folding or turn down portion of the collar or, in addition, on the neckband portion of the collar also. In the Figs. 12 to 22, 13 is the folding portion and 14 the neckband portion, the neckband portion being provided with the customary button-holes 15. Figs. 16 and 17 show in a somewhat diagrammatical and conventional manner one way in which the longitudinal ribs may be woven.

The fabric thus illustrated is woven with two sets of warp threads 17 interwoven with weft threads 18 to form two separate plies of fabric, these plies being separated by an intermediate filling thread layer 37 and integrally bound together by the interweave threads 19. An additional series of weft threads 20 is woven into the upper ply of the fabric, this weft thread passing over two or more of the warp threads and then passing between the two layers of fabric and under a plurality of warp threads of the upper ply. These weft threads woven into the fabric as described, will produce a pleasing and novel design in the fabric. The weft threads 20 may be of a different color or quality of thread from the threads which make up the body of the fabric. The interweave threads 19 are placed so as to bind the fabric together at the portions adjacent to the places where the weft thread 20 comes to the surface of the fabric, and are omitted at the intermediate portions. The presence of the interweave threads 19 and the weft threads 20, both tending to draw the upper ply of the fabric down, will have a tendency to cause the intermediate separate portions to bulge slightly, as illustrated at 21 in Fig. 17, particularly if these intermediate portions are woven more loosely. The fabric woven as described will present a pleasing and distinctive appearance, and furthermore will be provided with alternate weakened and stiffened portions 21 and 25 respectively.

As illustrated in Fig. 15, the fabric is woven curvilinear, the fabric on one side of the central line being woven with a weave as shown in Figs. 16 and 17, and the other half of the fabric being a two ply interwoven fabric with an intermediate filling thread layer. The collar blank may be cut from this fabric as shown by the dot and dash lines in Fig. 15. The outer or folding portion of the collar will present a distinctive and pleasing appearance, while the neckband portion will be made of a plain weave fabric. The natural fold of the collar may be provided by one of the weakened portions 21 in the specially woven fabric.

Figures 12, 13, 14:
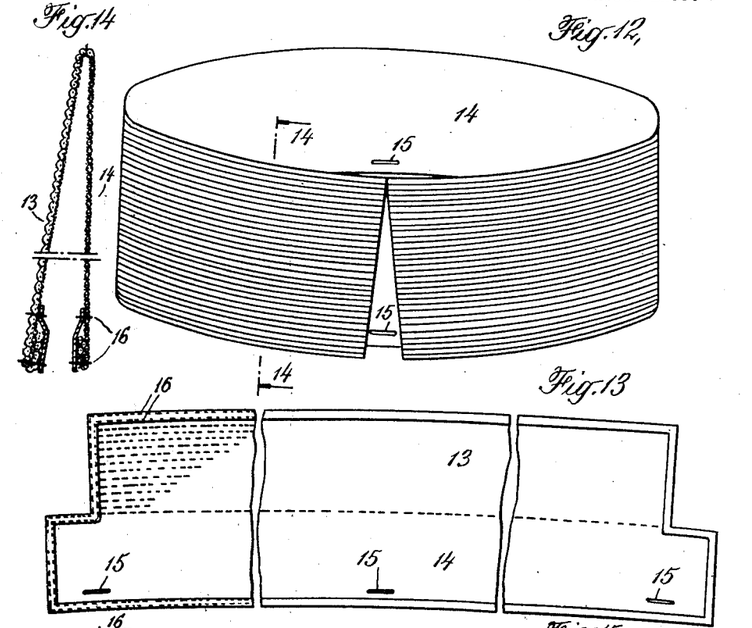
Fig. 12 is a perspective view of a collar provided with integral longitudinal ribs on its folding portion.
Fig. 13 is a plan view of the collar of Fig. 12 unfolded.
Fig. 14 is an enlarged sectional view taken on the line 14—14 of Fig. 12.

The edges of the collar blank cut from the fabric of Fig. 15 may be turned, overlaid with tape and secured by two rows of stitches 16, as shown in Figs. 13 and 14.

Figures 19, 20, 21:
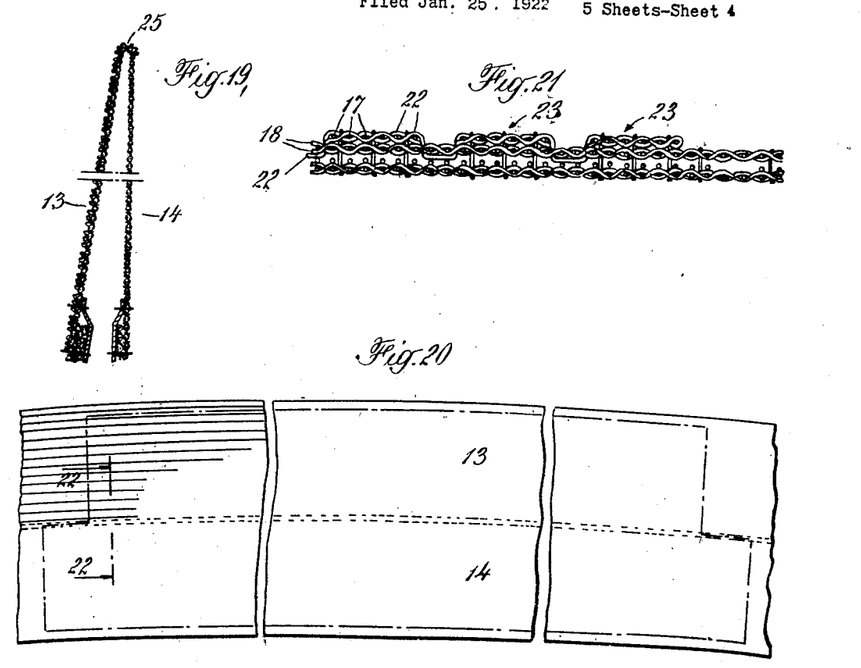
Fig. 19 shows a modification of the collar of Fig. 14.
Fig. 20 is a plan view of a strip of fabric from which the collar shown in Fig. 19 may be cut.
Fig. 21 is an enlarged sectional view showing conventionally a modification of the weave of the collar fabric.
Figure 22:
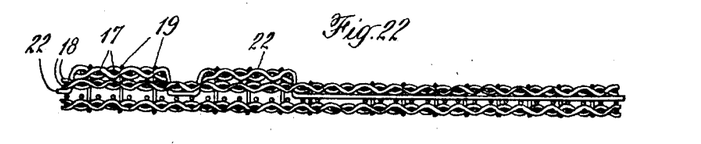
Fig. 22 is an enlarged sectional view taken on the line 22—22 of Fig. 20 and showing conventionally one weave of the fabric illustrated in Fig. 20.

Fig. 21 shows in a diagrammatical and conventional manner another suitable weave of the fabric of the collar of the present invention. The ribs 23 extend longitudinally of the fabric and are placed relatively close together so as to present an appearance comparable to that of a "whip-cord" fabric. The said ribs 23 are made up of an additional ply of fabric interwoven with the main body of the fabric. The weft threads 22 which interweave with the warp threads 17 to form the ribs 23 pass between the layers of the main portion of the fabric at the points where the ribs are not woven. Fig. 22 is a view taken along the line 22—22 of Fig. 20, showing the ribbed fabric terminating at the central portion of the strip of fabric and the plain or regular weave continuing beyond this portion.

An enlarged sectional view of a collar made up of the fabric of Figs. 21 and 22 is shown in Fig. 19. As will be noted, the fold portion 25 of the collar will fall along the portion between two of the ribs.

Figure 18:
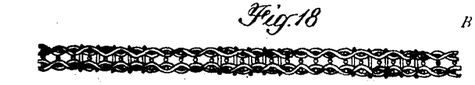
Fig. 18 is an enlarged sectional view showing a two ply fabric with an intermediate filling thread layer, certain portions only of said fabric being interwoven.

The fabric illustrated in Fig. 18 consists of a two ply fabric with an intermediate filling thread layer, the said fabric having the interweave threads omitted along certain strips in the fabric. The strips from which the interweave threads have been omitted present a different and distinctive weave from the weave of the main portion of the fabric. The fabric may be woven so that one of the said strips occurs at the fold portion of the collar and thus provides a natural fold line of increased flexibility. The neckband portion may be of regular multiple ply interwoven fabric.

Figure 23:
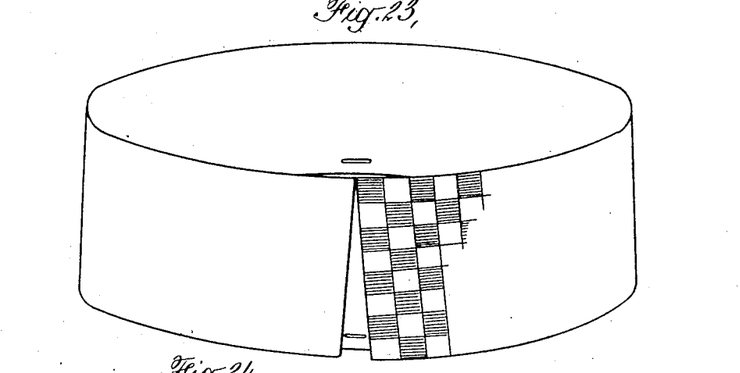
Fig. 23 is a perspective view of a collar having a checkered design on the turn down portion thereof.
Figure 24:
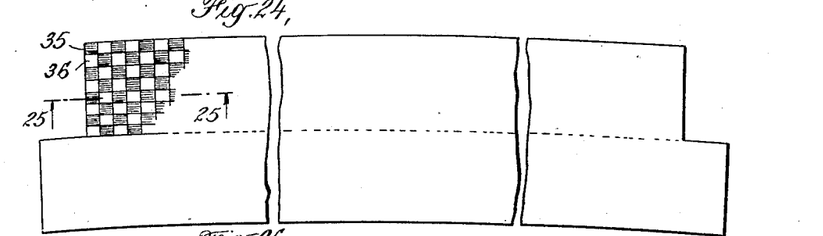
Fig. 24 is a plan view of the collar of Fig. 23 unfolded.
Figure 25:
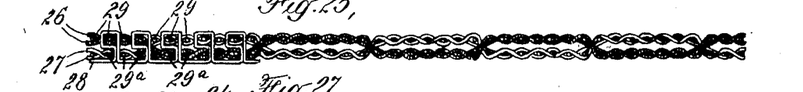
Fig. 25 is an enlarged sectional view taken on the line 25—25 of Fig. 24 and showing conventionally one weave of the checkered fabric.

Figs. 23 and 24 show a collar having a colored or otherwise distinctive checkered weave, woven in the folding portion thereof. Fig. 25 shows in a somewhat conventional manner one way in which the checkered fabric may be woven. In the figure, a set of colored warp threads 26 are interwoven with weft threads 29 on the face of the fabric. The said warp threads 26 then pass to the back of the fabric and are interwoven with the weft threads 29ª. Similarly, the white warp threads 27 are interwoven with a given number of weft threads 29ª and then pass to the face of the fabric and are woven with a similar number of weft threads 29. It will be obvious that this weave of the fabric will provide along a longitudinal strip of the said fabric, as shown at 35 in Fig. 24, alternate portions of colored and white fabric. The adjacent longitudinal strip 36 of Fig. 24 is so woven that the alternate colored and white portions are staggered with relation to the said portions of the strip 35. The interweave threads 28, as shown in Fig. 25, bind the fabric integrally together.

Figure 26:
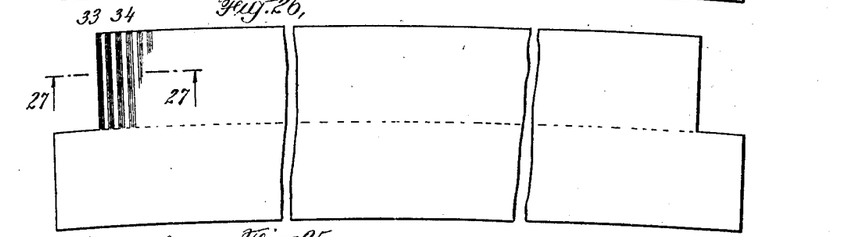
Fig. 26 is a plan view of a collar having a colored stripe woven in the turn down portion thereof.
Figure 27:
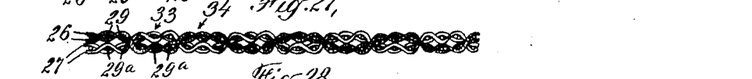
Fig. 27 is an enlarged sectional view taken on the line 27—27 of Fig. 26 and showing conventionally one weave of the striped fabric.

Fig. 26 shows a plan view of the collar, the folding portion of which is provided with a series of colored or otherwise distinctive stripes. Fig. 27 illustrates one way in which this fabric may be woven. In the figure, the colored warp threads 26 are interwoven with any desired number of weft threads 29 on the face of the fabric, and then pass to the back of the fabric and are interwoven with a similar number of weft threads 29ª. Similarly, the white warp thread 27 are interwoven with any desired number of back weft threads 29ª and then pass to the face of the fabric and are interwoven with similar number of face weft threads 29. It will be obvious that the fabric thus woven will present a series of alternate white and colored stripes.

Figure 28:
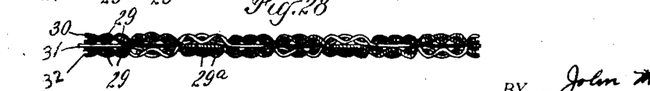
Fig. 28 is an enlarged sectional view showing conventionally a modification of the weave of Fig. 27.

Fig. 28 shows a modification of the weave of Fig. 27. In this figure, the set of warp threads 30 are interwoven, as above described, with weft threads 29 and then pass between the face and back layers of the fabric as intermediate filling threads, and thereafter pass to the back of the fabric and are interwoven with weft threads 29ª. The sets of warp threads 31 and 32 are woven in a similar manner and the resulting fabric is provided with a repeating series of three different colored stripes.

In certain of the appended claims I have employed the term semi-stiff as descriptive of the general type of fabric of which the collars of the present invention are preferably made. By this term I do not mean to define any particular degree of stiffness but I use it in a broad sense, as including all fabrics which in an unstarched condition possess greater inherent stiffness than ordinary unstarched "soft collar" or "soft cuff" material such, for example, as that used in making negligee shirts.

In the foregoing specification I have described my invention more particularly as applying to collars made of one piece of fabric, but I would have it expressly understood that I do not intend to limit myself to one piece collars but that I include also all collars made up in whole or in part of composite fabric having an inherent stiffness and set.

It will be understood that the accompanying drawings illustrate the invention and do not limit the invention thereto. In addition to the weaves that have been indicated, other and similar weaves are within the scope of the invention. Furthermore, while I have shown and described a curvilinear fabric as the preferred embodiment of my invention I do not limit myself to a fabric of curvilinear weave, as straight fabrics of various kinds can also be used.

I claim:

1. A folding collar made of semi-stiff fabric comprising a neckband portion and a turn-down portion, said collar having woven in at least one of said portions a plurality of relatively narrow thickened zones which tend to stiffen the collar and which are adapted to facilitate the folding of the collar along a longitudinal curvilinear line of fold.

2. A folding collar made of multiple ply interwoven fabric comprising a neckband portion and a turn-down portion, said collar having woven in at least one of said portions a plurality of relatively narrow thickened zones which tend to stiffen the collar and which are adapted to facilitate the folding of the collar along a longitudinal curvilinear line of fold.

3. A folding collar made of one piece of semi-stiff fabric comprising a neckband portion and a turn-down portion, said collar having woven in the turn-down portion thereof a plurality of narrow thickened and stiffened zones adapted to determine the longitudinal curvilinear line of fold of the collar.

4. A folding collar made of one piece of multiple ply interwoven fabric comprising a neckband portion and a turn-down portion, said collar having woven in the turn-down portion thereof a plurality of narrow thickened and stiffened zones adapted to determine the longitudinal curvilinear line of fold of the collar.

5. A folding collar made of semi-stiff fabric comprising a neckband portion and a turn-down portion, said collar having woven in at least one of said portions a plurality of longitudinal curvilinear thickened zones which stiffen the collar from the fold zone to the base of said collar and which provide between two of the said thickened zones near the junction of the two portions, a natural curvilinear line of fold of the collar.

6. A folding collar made of multiple ply interwoven fabric comprising a neckband portion and a turn-down portion, said collar having woven in at least one of said portions a plurality of longitudinal curvilinear thickened zones which stiffen the collar from the fold zone to the base of said collar and which provide between two of the said zones near the junction of the two portions, a natural curvilinear line of fold of the collar.

7. A folding collar made of one piece of semi-stiff fabric comprising a neckband portion and a turn-down portion, said collar having woven in the turn-down portion thereof a series of narrow curvilinear thickened and stiffened zones running longitudinally of the fabric and the curve being such that, at the transverse center line of the collar, each of the said zones departs at least $\frac{1}{4}''$ from a straight line connecting its ends; the said series of thickened and stiffened zones stiffening the collar across the entire outer face thereof and providing, between two of the said zones near the junction of the neckband and turn-down portions, a curvilinear fold portion along which the collar will naturally fold.

8. A folding collar made of one piece of multiple ply interwoven fabric comprising a neckband portion and a turn-down portion, said collar having woven in the turn-down portion thereof a series of narrow curvilinear thickened and stiffened zones running longitudinally of the fabric and the curve being such that, at the transverse center line of the collar, each of the said zones departs at least $\frac{1}{4}''$ from a straight line connecting its ends; the said series of thickened stiffened zones stiffening the collar across the entire outer face thereof and providing, between two of the said zones near the junction of the neckband and turn-down portions, a curvilinear fold portion along which the collar will naturally fold.

In testimony whereof I affix my signature.

JOHN MANNING van HEUSEN.